(12) United States Patent
Stewart

(10) Patent No.: US 7,720,559 B1
(45) Date of Patent: May 18, 2010

(54) DYNAMIC TOOL SCHEDULING BASED UPON DEFECTS

(75) Inventor: Edward C. Stewart, Buda, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 359 days.

(21) Appl. No.: 10/133,073

(22) Filed: Apr. 26, 2002

(51) Int. Cl.
*G06F 19/00* (2006.01)

(52) U.S. Cl. ............... 700/121; 700/101; 700/110

(58) Field of Classification Search ........... 700/96, 700/99–104, 108–110, 121
See application file for complete search history.

(56) References Cited

U.S. PATENT DOCUMENTS

| | | | | |
|---|---|---|---|---|
| 5,375,061 A * | 12/1994 | Hara et al. | ............... | 700/101 |
| 6,021,360 A * | 2/2000 | Barker et al. | ............... | 700/174 |
| 6,360,133 B1 * | 3/2002 | Campbell et al. | ............... | 700/115 |
| 6,438,436 B1 * | 8/2002 | Hohkibara et al. | ............... | 700/97 |
| 6,584,369 B2 * | 6/2003 | Patel et al. | ............... | 700/100 |
| 6,594,536 B1 * | 7/2003 | Lin et al. | ............... | 700/99 |
| 6,604,012 B1 * | 8/2003 | Cho et al. | ............... | 700/121 |
| 6,615,101 B1 * | 9/2003 | Nicholson et al. | ............... | 700/173 |
| 6,675,058 B1 * | 1/2004 | Pasadyn et al. | ............... | 700/121 |
| 6,701,204 B1 * | 3/2004 | Nicholson | ............... | 700/121 |
| 6,732,006 B2 * | 5/2004 | Haanstra et al. | ............... | 700/121 |
| 6,763,277 B1 * | 7/2004 | Allen et al. | ............... | 700/100 |

* cited by examiner

*Primary Examiner*—Paul L Rodriguez
*Assistant Examiner*—Nathan Laughlin
(74) *Attorney, Agent, or Firm*—Williams, Morgan & Amerson, P.C.

(57) ABSTRACT

A method and an apparatus for routing a semiconductor wafer to at least one of a plurality of processing tools based upon tool performance. Data relating to a performance of a first processing tool and a performance of a second processing tool is acquired. A semiconductor wafer is routed to one of the first processing tool or the second processing tool based upon a comparison between the performance of the first processing tool and the performance of the second processing tool using a controller.

32 Claims, 8 Drawing Sheets

DYNAMIC TOOL SCHEDULING BASED UPON DEFECTS

BACKGROUND OF THE INVENTION

1. Field of the Invention

This invention relates generally to semiconductor manufacturing, and, more particularly, to a method and apparatus for performing a tool scheduling process, which includes matching a particular process with an appropriate tool.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure. Typically, forming trenches across the semiconductor wafer and filling such trenches with an insulating material, such as silicon dioxide, form STI structures across the semiconductor wafers.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed across the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a flow chart illustration of a prior art process flow is illustrated. A manufacturing system processes a lot/batch of semiconductor wafers 105 (block 210). The manufacturing system then generally acquires metrology data relating to the processed semiconductor wafers 105 (block 220). The manufacturing system may also acquire manufacturing-environment data, such as pressure data, temperature data, humidity data, gas flow rate data, and the like. Generally, the manufacturing system then analyzes the metrology data and/or the manufacturing-environment data to determine whether there are appreciable errors across the processed semiconductor wafers 105 (block 230).

The manufacturing system may then perform a feedback correction on processes performed on the semiconductor wafers 105 based upon the analysis of the metrology/manufacturing-environment data (block 240). Utilizing current manufacturing methods, efficient matching of a particular process to the best available processing tool may not occur without tedious manual intervention. Furthermore, isolation and/or tagging of particular processing tools that may be lagging behind other processing tools, in terms of efficiency and accuracy of processing, may not timely occur.

Among the problems associated with implementing the current processes include the fact that some processing tools may perform certain processes on particular layers of a semiconductor wafer 105 in an inefficient or inaccurate manner. For example, some processing tools may process the fourth layer of semiconductor wafers 105 in a lot in an inefficient or inaccurate manner (e.g., an etch process that may not be timed and executed well by a particular processing tool), but may be more efficient in processing layers 1 through 3. This could lead to inefficiency in manufacturing of semiconductor devices. Furthermore, this could lead to an increased number of errors and faults on the processed semiconductor wafers 105. The state of the art processes include routing semiconductor wafers in a sequential manner without much regard to the actual efficiency of each processing tool on particular layers of processed on semiconductor wafers 105. This could lead to inefficiency in semiconductor device manufacturing.

The present invention is directed to overcoming, or at least reducing, the effects of, one or more of the problems set forth above.

SUMMARY OF THE INVENTION

In one aspect of the present invention, a method is provided for routing a semiconductor wafer to at least one of a plurality of processing tools based upon tool performance. Data relating to a performance of a first processing tool and a performance of a second processing tool is acquired. A semiconductor wafer is routed to one of the first processing tool or the second processing tool based upon a comparison between the performance of the first processing tool and the performance of the second processing tool using a controller.

In another aspect of the present invention, a system is provided for routing a semiconductor wafer to at least one of a plurality of processing tools based upon performance. The system of the present invention comprises: a plurality of processing tools to process semiconductor wafers; and a process controller operatively coupled to the processing tools, the process controller to control operations of the processing tools and perform a selective tool-scheduling process, the selective tool-scheduling process comprising determining a hierarchy for a plurality of the processing tools based upon performance of the processing tools and routing a semiconductor wafer to at least one of the processing tools for processing based upon the hierarchy.

In another aspect of the present invention, an apparatus is provided for routing a semiconductor wafer to at least one of a plurality of processing tools based upon performance. The apparatus of the present invention comprises: a process controller operatively coupled to a plurality of processing tools, the process controller to control operations of the processing tools and perform a selective tool-scheduling process, the selective tool-scheduling process comprising determining a hierarchy for a plurality of the processing tools based upon performance of the processing tools and routing a semiconductor wafer to at least one of the processing tools for processing based upon the hierarchy.

In yet another aspect of the present invention, a computer readable program storage device encoded with instructions is provided for routing a semiconductor wafer to at least one of a plurality of processing tools based upon performance. The computer readable program storage device encoded with instructions when executed by a computer: acquires data relating to a performance of a first processing tool and a performance of a second processing tool; and routes a semiconductor wafer to one of the first processing tool and the second processing tool based upon a comparison between the performance of the first processing tool and the performance of the second processing tool using a controller.

BRIEF DESCRIPTION OF THE DRAWINGS

The invention may be understood by reference to the following description taken in conjunction with the accompanying drawings, in which like reference numerals identify like elements, and in which.

Figure 1:
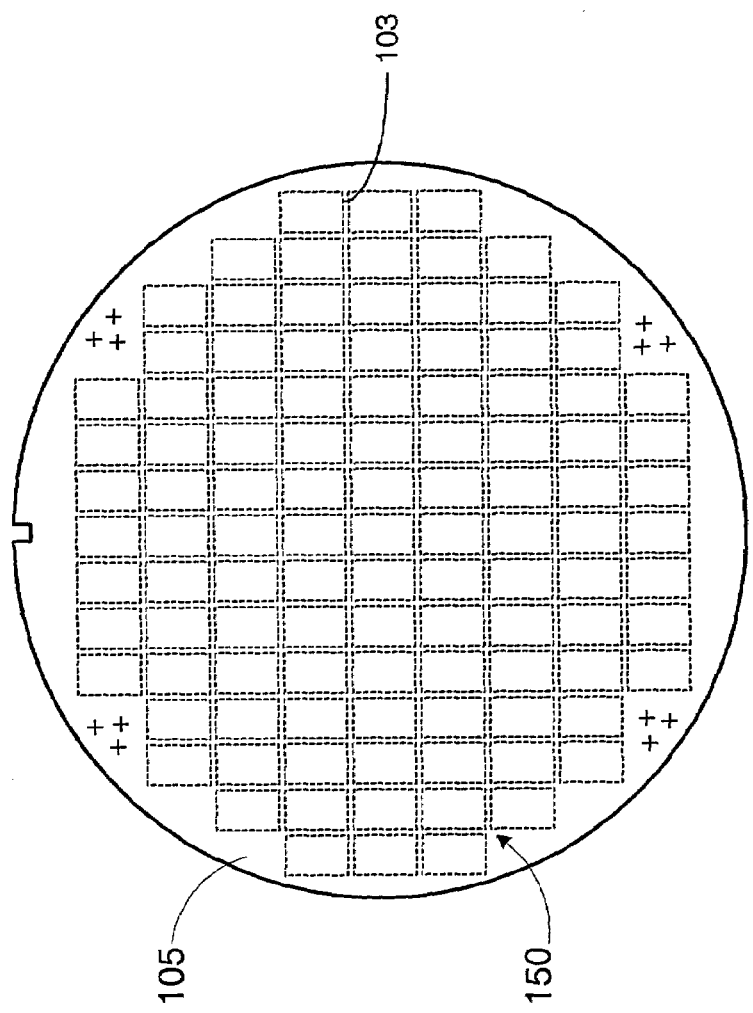
FIG. 1 is a simplified diagram of a prior art semiconductor wafer being processed.
Figure 2:
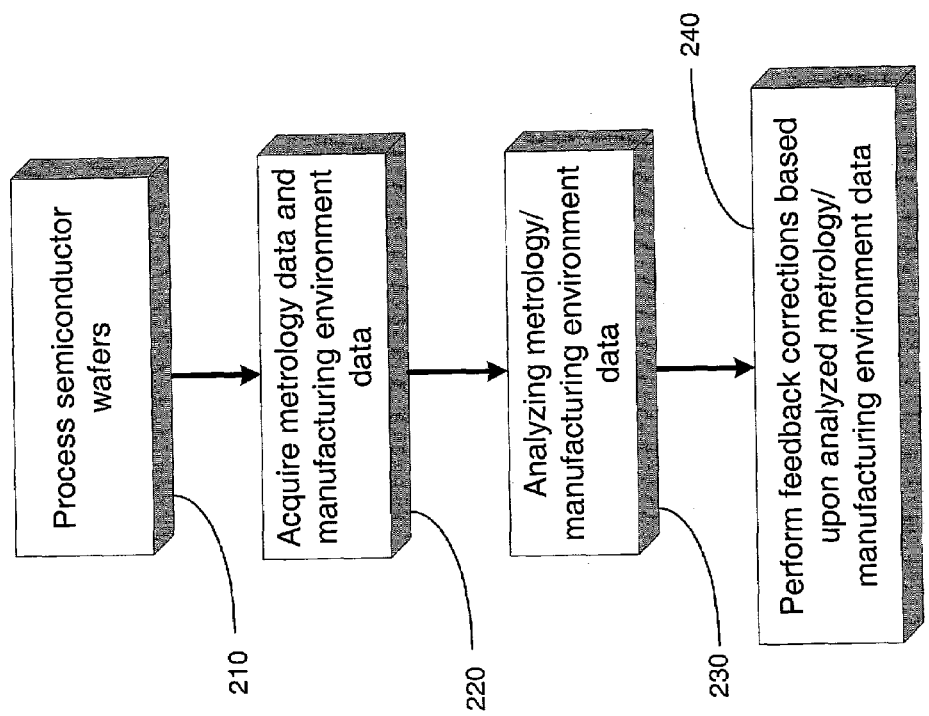
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, semiconductor devices are stepped through multiple manufacturing process tools. Scheduling a process flow that substantially matches particular processes with the best available processing tools can improve the efficiency and overall quality of the processed semiconductor wafers. Embodiments of the present invention provide for processing semiconductor wafers 105 using a plurality of processing tools and acquiring data relating to the processed semiconductor wafers 105, in order to determine an efficient scheduling/routing of semiconductor wafers 105 to be processed.

Embodiments of the present invention provide for analyzing metrology data and/or manufacturing-environment data to determine faults detected on semiconductor wafers 105, which may then be used to determine the performance of particular processing tools. Data relating to the performance of processing tools may be accumulated and stored into a database for later retrieval. The performance of particular processing tools is correlated to particular layers processed on the semiconductor wafers 105. Embodiments of the present invention provide for determining which processing tool is more efficient and/or accurate in terms of processing particular types of layers on semiconductor wafers 105.

The performance data relating to the processing tools can also be used to determine a scheduling methodology for utilizing the processing tools that most efficiently process particular layers of a semiconductor wafer 105. Scheduling may also take into account business rules and create a hierarchy of desirable tools to perform particular processes on semiconductor wafers 105. Scheduling may be implemented to route semiconductor wafers 105 to tools that perform the most efficient and accurate processes with respect to the formation of certain layers on semiconductor wafers 105 while still maintaining adequate compliance with business rules. Utilizing embodiments of the present invention, particular tools may be identified that may need maintenance based upon the fact that the scheduling of processing of semiconductor wafers 105 is very light for a particular processing tool.

Figure 3:
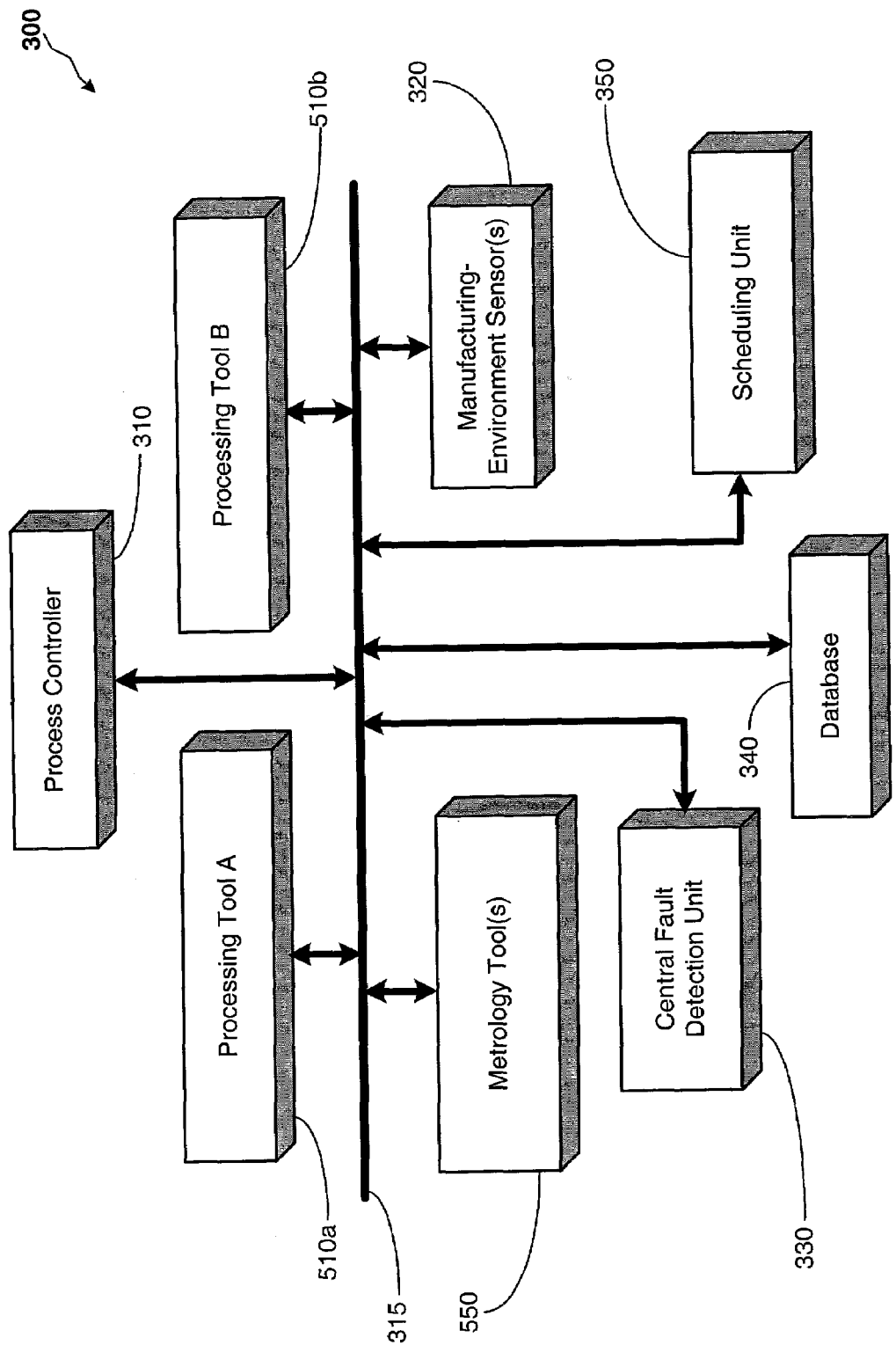
FIG. 3 is a block diagram representation of a system in accordance with one illustrative embodiment of the present invention.

Turning now to FIG. 3, a block diagram depiction of a system 300, in accordance with embodiments of the present invention, is illustrated. A plurality of processing tools 510a, 510b are generally controlled by a process controller 310. The system 300 also includes one or more metrology tools 550 and manufacturing-environment sensors 320 to acquire metrology data and manufacturing-environment data, respectively. The manufacturing-environment sensors 320 are generally associated with particular processing tools 510. The manufacturing-environment sensor 320 may include, but is not limited to, a temperature sensor, a pressure sensor, a humidity sensor, a gas flow rate sensor, and the like.

The system 300 also comprises a database 340, a central fault detection unit 330, and a scheduling unit 350, which may communicate with the processing tools 510 and the process controller 310 via a system communication link and/or a network connection 315. The system communications link 315 may be a computer bus link, a dedicated hardware communications link, a telephone system communications link, a wireless communications link, or other communication links that may be implemented by those skilled in the art having benefit of the present disclosure. In one embodiment, the central fault detection unit 330 and/or the scheduling unit 350 may be hardware, software, and/or firmware units that may be standalone units or may be integrated into a computer system associated with the process controller 310.

The processing tool 510a, 510b may perform a plurality of processes on the semiconductor wafers 105. The metrology tool 550 generally acquires data relating to the processed semiconductor wafers 105. The manufacturing-environment sensor 320 may acquire manufacturing-environment data relating to the processing of the semiconductor wafers 105. The manufacturing-environment data may include, but are not limited to temperature data, humidity data, gas flow rate data, pressure data, and the like.

The central fault detection unit 330 performs fault detection analysis based upon manufacturing-related data, such as the metrology data and/or the manufacturing-environment data. What constitutes a fault may be a function of predetermined thresholds defined for particular types of processes performed on the semiconductor wafers 105. The central fault detection unit 330 may produce analyzed fault data, which may be utilized by the scheduling unit 350 to schedule processing of semiconductor wafers 105 among the processing tools 510. The scheduling unit 350 may receive data relating to the processing tools 510 from the database 340. The database 340 may contain data relating to the performance history of one or more tools 510 associated with the system 300. The database 340 may also comprise a hierarchy of processing tools 510 that reflects the order of processing tools 510 based upon the efficiency and accuracy of the performance of the processing tools 510.

Based upon fault data from the central fault detection unit 330, the scheduling unit 350 is able to identify particular processing tools 510 that are more efficient and/or accurate in terms of performing particular processes performed on certain layers formed above the semiconductor wafers 105. For example, the process used to form certain features of a transistor formed on a semiconductor wafer 105 may be performed more accurately and efficiently by the processing tool B 510b as compared to the performance of processing tool A 510a. For example, one tool may be more accurate and efficient in forming features to a desired or target critical dimension. The scheduling unit 350 may determine that a structure relating to a particular feature is to be formed in the next processing step. Therefore, the scheduling unit 350 may route the particular semiconductor wafer 105 upon which this structure is to be formed, to processing tool B 510b instead of processing tool A 510a, even though processing tool A 510a was available. However, this decision may be measured against particular business rules that may dictate that utilizing processing tool A 510a immediately and correcting any errors/faults may be more cost effective than not having to correct the errors by waiting to use processing tool B 510b. Similarly, the system 300 may also perform a selective tool-scheduling process that goes through a hierarchy of tools based on performance and/or business rules to select particular tools for particular processes.

Figure 4:
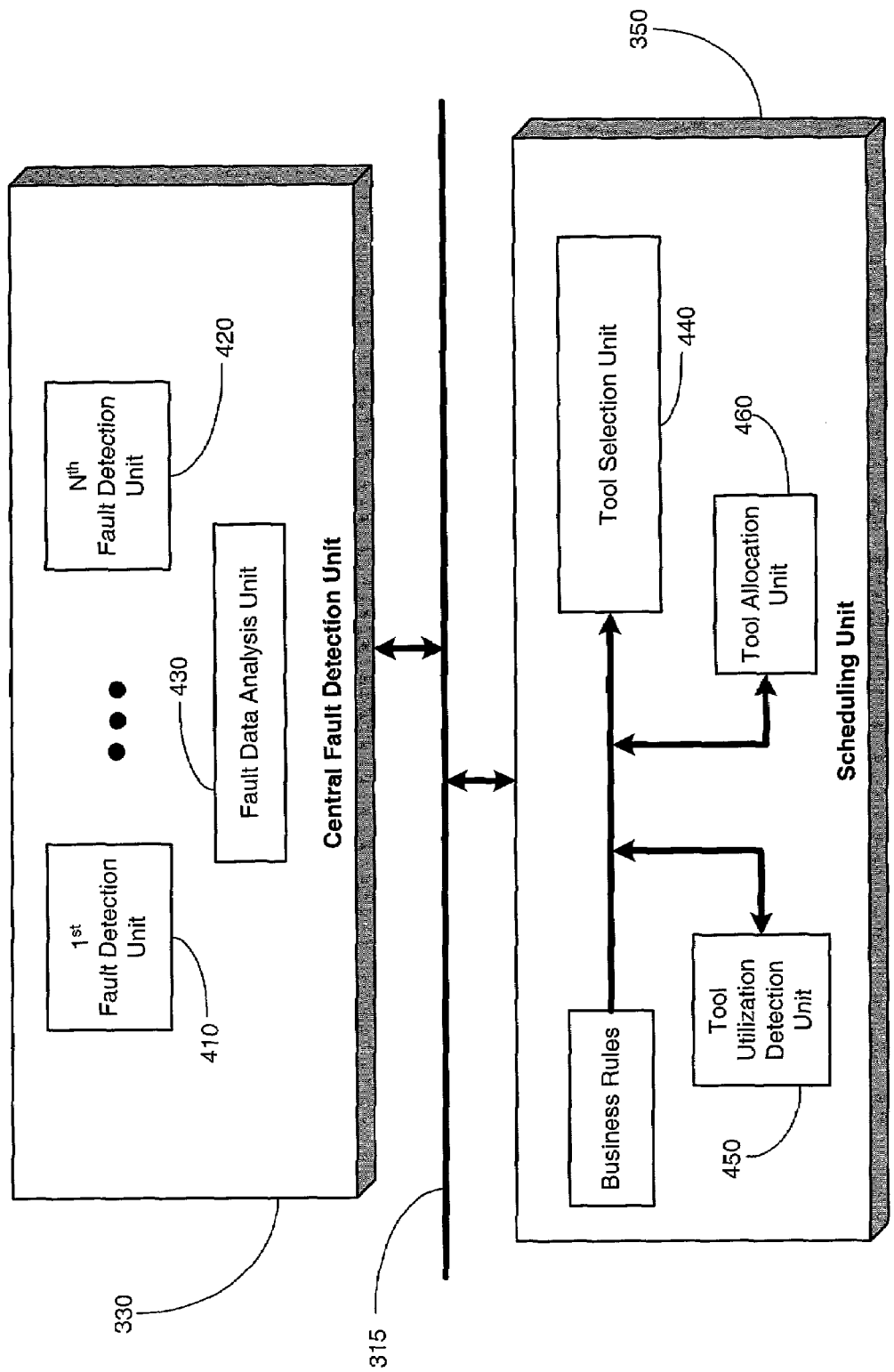
FIG. 4 is a more detailed block diagram representation of a central fault detection unit and a scheduling unit from the system of FIG. 3, in accordance with one illustrative embodiment of the present invention.

Turning now to FIG. 4, a more detailed block diagram depiction of the central fault detection unit 330 and the scheduling unit 350, in accordance with one embodiment of the present invention, is illustrated. The central fault detection unit 330 comprises a first through an $N^{th}$ fault detection unit 410, 420 that are capable of acquiring fault data relating to processed semiconductor wafers 105. In one embodiment, each fault detection unit 410, 420 may be associated with a particular processing tool 510. For example, the first fault detection unit 410 may correlate with the processing tool A 510a, wherein the $N^{th}$ fault detection unit 420 may correlate with the processing tool B 510b. A fault data analysis unit 430 analyzes the fault data received by the fault detection units 410, 420. The fault data analysis unit 430 analyzes the fault data and determines whether the severity of the fault merits further corrective action.

In one embodiment, the scheduling unit 350 comprises a tool selection unit 440 for selecting a processing tool 510 to perform a particular process. The scheduling unit 350 receives the analyzed fault data from the central fault detection unit 330 and performs a tool selection process based upon the fault data and/or business rules. The tool selection unit 440 in the scheduling unit 350 is capable of selecting particular processing tools 510 for certain processes based upon the accuracy and efficiency of certain processing tools 510 in performing certain process operations. This selection may be weighed against one or more business rules that may require usage of another processing tool 510 that may not be the most efficient or accurate at performing the process. The tool selection unit 440 selects a processing tool 510 using a hierarchical structure, wherein if the first choice for a processing tool 510 is not available, a second choice is made, and so on.

The scheduling unit 350 also comprises a tool utilization detection unit 450 and a tool allocation unit 460. A tool allocation unit 460 receives data from the tool selection unit 440 and allocates a time slot for particular processing tools 510 for performing processes on particular semiconductor wafers 105. The scheduling unit 350 may schedule a process time with a particular processing tool 510 and route certain semiconductor wafers 105 to the selected processing tool 510. At predetermined time intervals, the tool utilization detection unit 450 may check the utilization of processing tools 510 associated with the system 300 based upon the tool selection performed by embodiments of the present invention. If a particular processing tool 510 is exceptionally faulty, eventually, the tool selection unit 440 may route most semiconductor wafers 105 generally away from that particular processing tool 510. Therefore, if the tool utilization is low for a particular processing tool 510, a determination may be made that the particular processing tool 510 may require calibration, maintenance, and/or other types of corrective actions. If utilization for a particular processing tool 510 is below a certain predetermined threshold, an alarm or an alert may be sent to the process controller 310 for initiating corrective action.

Figure 5:
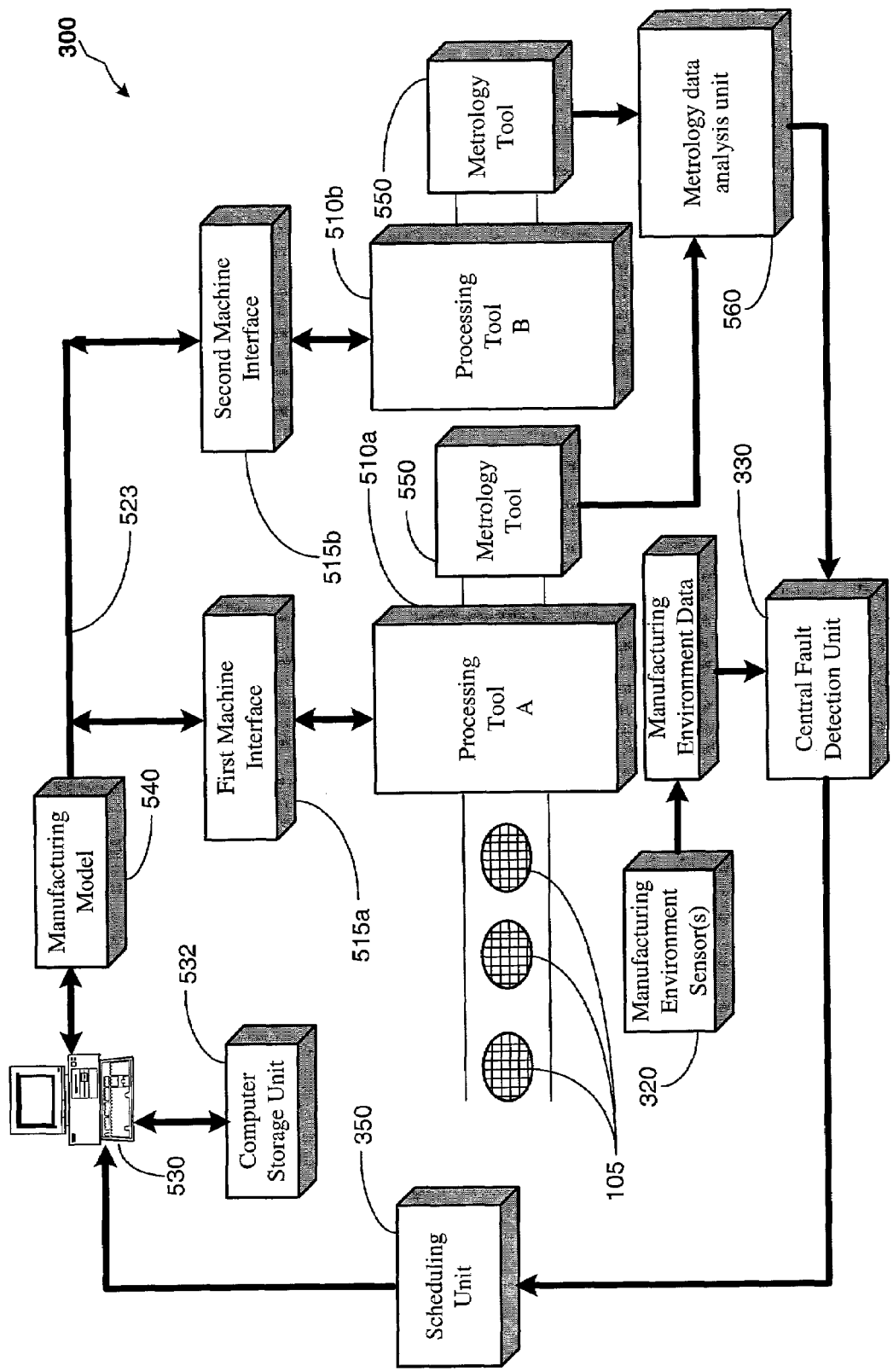
FIG. 5 illustrates a more detailed block diagram representation of the system shown in FIG. 3, in accordance with one illustrative embodiment of the present invention.

Turning now to FIG. 5, a more detailed block diagram of the system 300 in accordance with one embodiment of the present invention is illustrated. Semiconductor wafers 105 are processed on processing tools 510a, 510b using a plurality of control input signals, or manufacturing parameters, provided via a line or network 523. The control input signals, or manufacturing parameters, on the line 523 are sent to the processing tools 510a, 510b from a computer system 530 via machine interfaces 515a, 515b. The first and second machine interfaces 515a, 515b are generally located outside the processing tools 510a, 510b. In an alternative embodiment, the first and second machine interfaces 515a, 515b are located within the processing tools 510a, 510b. The semiconductor wafers 105 are provided to and carried from a plurality of processing tools 510. In one embodiment, semiconductor wafers 105 may be provided to a processing tool 510 manually. In an alternative embodiment, semiconductor wafers 105 may be provided to a processing tool 510 in an automatic fashion (e.g., robotic movement of semiconductor wafer 105). In one embodiment, a plurality of semiconductor wafers 105 is transported in lots (e.g., stacked in cassettes) to the processing tools 510.

In one embodiment, the computer system 530 sends control input signals, or manufacturing parameters, on the line 523 to the first and second machine interfaces 515a, 515b. The computer system 530 is capable of controlling processing operations. In one embodiment, the computer system 530 is a process controller. The computer system 530 is coupled to a computer storage unit 532 that may contain a plurality of software programs and data sets. The computer system 530 may contain one or more processors (not shown) that are capable of performing the operations described herein. The computer system 530 employs a manufacturing model 540 to generate control input signals on the line 523. In one embodiment, the manufacturing model 540 contains a manufacturing recipe that determines a plurality of control input parameters that are sent on the line 523 to the processing tools 510a, 510b.

In one embodiment, the manufacturing model 540 defines a process script and input control that implement a particular manufacturing process. The control input signals (or control input parameters) on the line 523 that are intended for processing tool A 510a are received and processed by the first machine interface 515a. The control input signals on the line 523 that are intended for processing tool B 510b are received and processed by the second machine interface 515b. Examples of the processing tools 510a, 510b used in semiconductor manufacturing processes are steppers, etch process tools, deposition tools, and the like.

One or more of the semiconductor wafers 105 that are processed by the processing tools 510a, 510b can also be sent to a metrology tool 550 for acquisition of metrology data. The metrology tool 550 may be a scatterometry data acquisition tool, an overlay-error measurement tool, a critical dimension measurement tool, and the like. In one embodiment, a metrology tool 550 examines one or more processed semiconductor wafers 105. The metrology data analysis unit 560 may collect, organize, and analyze data from the metrology tool 550. The metrology data is directed to a variety of physical or electrical characteristics of the devices formed across the semiconductor wafers 105. For example, metrology data may be obtained as to line width measurements, depth of trenches, sidewall angles, thickness, resistance, and the like. Metrology data may be used to determine faults that may be present across the processed semiconductor wafers 105, which may be used to quantify the performance of the processing tools 510.

Metrology data from the metrology data analysis unit 560 and manufacturing-environment data from the manufacturing-environment sensors 320 are sent to the central fault detection unit 330. As described above, the central fault detection unit 330 then analyzes the data and sends analyzed fault data to the scheduling unit 350, which also receives tool data and hierarchical data from the database 340. The scheduling unit 350 then determines an efficient routing and scheduling protocol that routes certain semiconductor wafers 105 to particular processing tools 510 selected by the scheduling unit 350. The scheduling data is then sent to the computer system 530 for implementation. The components described above may be integrated into the APC framework.

Figure 6:
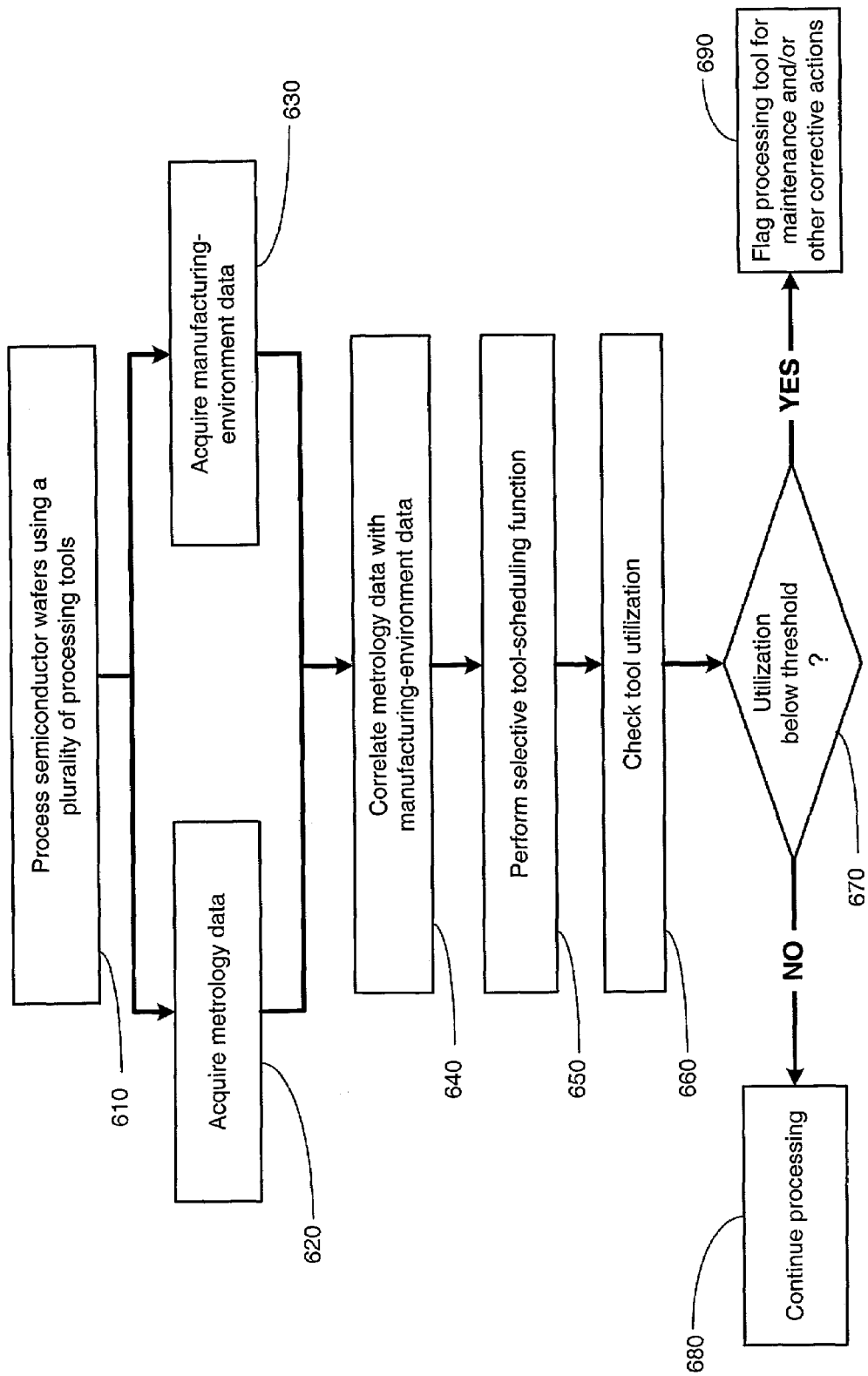
FIG. 6 illustrates a flowchart depiction of a method in accordance with one illustrative embodiment of the present invention.

Turning now to FIG. 6, a flowchart depiction of embodiments relating to the methods of the present invention is illustrated. The system 300 processes a plurality of semiconductor wafers 105 using a plurality of processing tools 510 (block 610). Upon processing of semiconductor wafers 105, the system 300 may acquire metrology data associated with the processed semiconductor wafers 105 (block 620). In one embodiment, the system 300 may also acquire manufacturing-environment data relating to the operation of the processing tools 510 (block 630). The manufacturing-environment data may include temperature data, humidity data, gas flow rate data, pressure data, and the like. The system 300 may then correlate the metrology data with the particular manufacturing-environment data to provide the data for fault detection analysis (block 640).

Upon correlation of the metrology data with the manufacturing-environment data, the system 300 performs a selective tool-scheduling process (block 650). The selective tool-scheduling process provides data relating to the selection of a particular processing tool 510 for a particular process to be performed on the semiconductor wafers 105. A more detailed flowchart illustration of the method for performing the selective tool-scheduling process indicated in block 650 is provided in FIG. 7 and accompanying description below.

Upon performing the selective tool-scheduling process, the system 300 performs a tool utilization check to determine the general usage of processing tools 510 associated with the system 300 (block 660). The system 300 determines whether the tool utilization of a particular processing tool 510 is below a predetermined threshold of utilization (block 670). Business rules may dictate that when a processing tool 510 is below a certain percentage-utilization within a predetermined time period, intervention may be required to bring the processing tool 510 up to cost effective utilization. Those skilled in the art having benefit of the present disclosure may determine the minimum utilization for a particular processing tool 510 before a particular processing tool 510 is flagged for maintenance and/or other corrective action. When the system 300 determines that the tool utilization is not below a predetermined threshold, the system 300 continues the processing of semiconductor wafers 105 using the current mode of operation (block 680). If the system 300 determines that the tool utilization is below a predetermined threshold, the system 300 flags the processing tool 510 for maintenance and/or other corrective actions (block 690).

Utilizing the steps provided in FIG. 6, the system 300 is able to route semiconductor wafers 105 through manufacturing premises using a more efficient routing. Processing tools 510 that generally perform particular processes in a more efficient and accurate manner, are given a higher position in a hierarchy. In other words, the system 300 pairs certain processes to particular processing tools 510 that tend to perform those processes in a more efficient and accurate manner. Furthermore, implementation of the routing and scheduling provided by embodiments of the present invention provides for isolating and flagging a processing tool 510 that is performing below standards relative to the performance of other processing tools 510 in the system 300.

Figure 7:
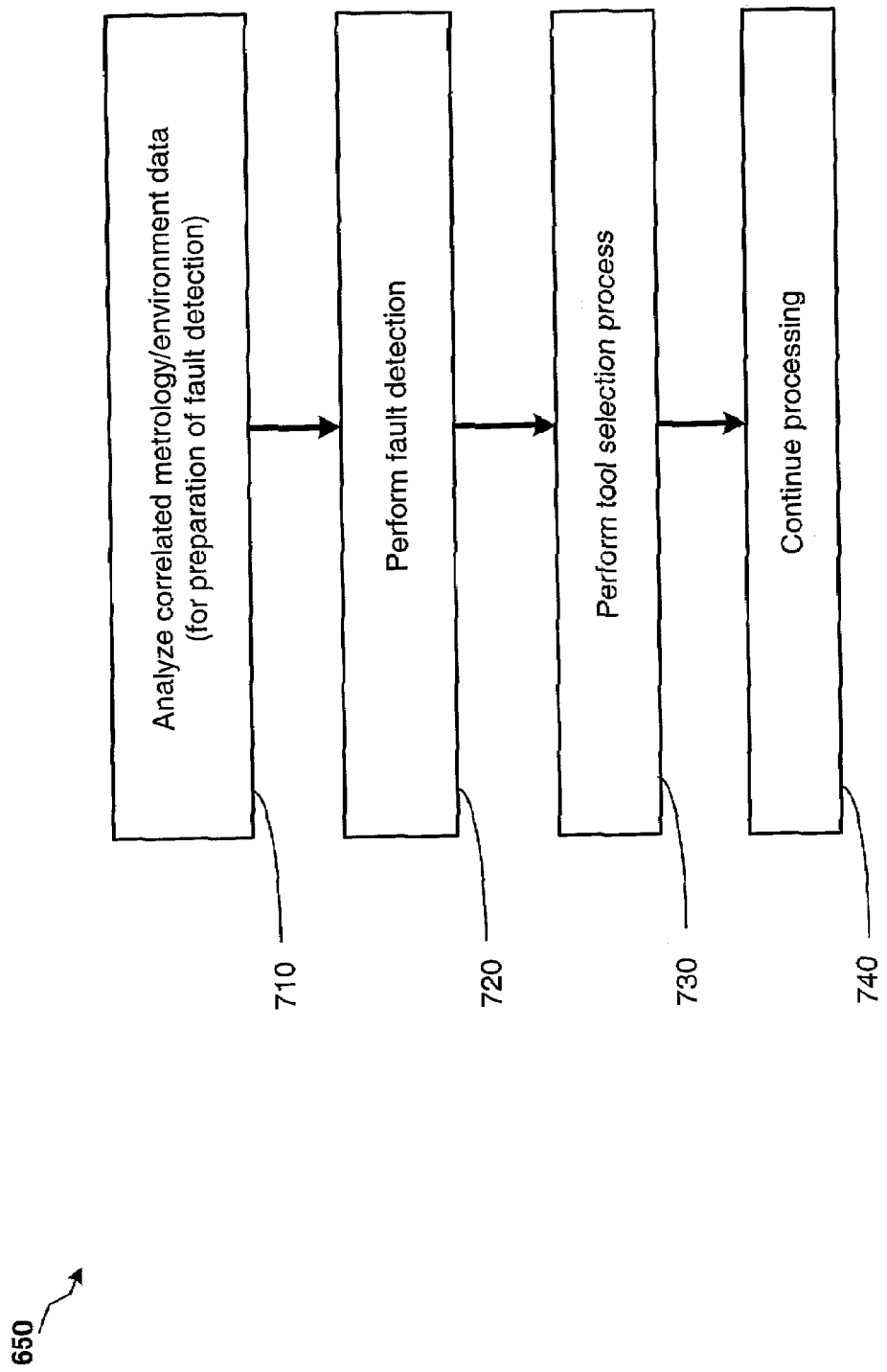
FIG. 7 illustrates a flowchart depiction of a method of performing a selective tool-scheduling process, as indicated in FIG. 6, in accordance with one illustrative embodiment of the present invention.

FIG. 7 depicts a more detailed flowchart relating to the steps for performing the selective tool-scheduling process (block 650 of FIG. 6), in accordance with one illustrative embodiment of the present invention. Upon receiving correlated metrology/manufacturing-environment data, the system 300 analyzes the correlated metrology/manufacturing-environment data in order to perform fault detection (block 710). The system 300 then performs fault detection based upon the analysis of the correlated metrology/manufacturing-environment data (block 720). In one embodiment, the metrology tool 550 acquires the metrology data and the manufacturing-environment sensors 320 acquire the manufacturing-environment data. The central fault detection unit 330 performs the fault detection.

Upon performing the fault detection, the system 300 performs a tool selection process (block 730). The tool selection process selects a particular processing tool 510 for certain processes (e.g., performing a particular process on a certain layer of the semiconductor wafer 105), where that particular processing tool 510 is predicted to be more efficient and accurate in performing that process. A more detailed flowchart description of the steps for performing the tool selection process indicated in block 730 is provided in FIG. 8 and the accompanying description below. Upon selection of a particular processing tool 510, the system 300 continues processing semiconductor wafers 105 based upon the tool selection(s) (block 740). The completion of the steps illustrated in FIG. 7 substantially completes the process of performing the selective tool-scheduling process indicated in block 650 of FIG. 6.

Figure 8:
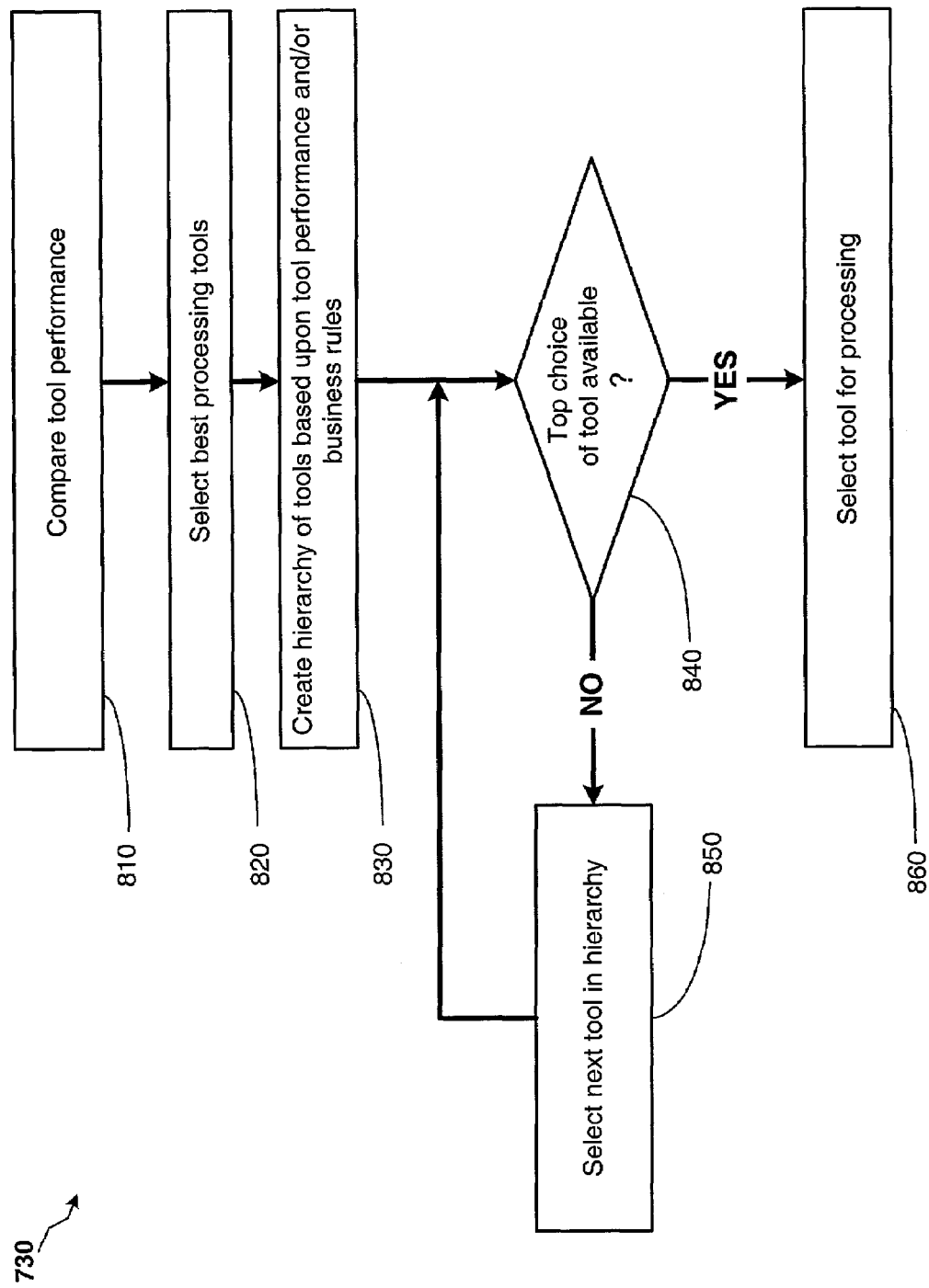
FIG. 8 illustrates a flowchart depiction of a method of performing a tool selection process, as indicated in FIG. 7, in accordance with one illustrative embodiment of the present invention.

FIG. 8 depicts a more detailed flowchart relating to the steps for performing the tool selection process indicated in block 730 of FIG. 7, in accordance with one illustrative embodiment of the present invention. The system 300 compares tool performance of various processing tools 510 based upon manufacturing data, such as the fault detection data (block 810). The system 300 can compare the number and/or severity of particular faults and compare the performance of various processing tools 510 based upon the severity and the number of faults. For example, a severity level of zero through five may be assigned to certain faults detected (where zero is the least severe and five is the most severe fault). Therefore, if a particular processing tool 510 incurs a fewer number of faults, but of a higher severity variety (e.g., four or five severity level faults), another process tool B 510*b*, which produces more faults but of a much lower severity level (e.g., zero or one severity level faults), may be chosen to process the semiconductor wafers 105.

Once the system 300 compares tool performance, the system 300 selects the best processing tools 510 to perform a particular process on certain layers of the semiconductor wafers 105 (block 820). Selecting the best processing tools 510 may include selecting a number of processing tools 510 and ranking them in the order of best to worst. The system 300 creates a hierarchy of processing tools 510 based upon the tool performance and/or business rules (block 830). For example, a hierarchy of desirable processing tools 510 to perform a particular process may not be necessarily in the best to worst order. Business rules may dictate that the third best option to perform a particular process may actually be first on the hierarchy because of a particular business rule that requires the use of the other processing tools 510 for different processes.

Based upon certain business rules and tool performance, the hierarchy of processing tools 510 is used to process semiconductor wafers 105 in a more efficient and accurate manner. When faced with a decision to route semiconductor wafers 105 for a particular processing step, the system 300 determines whether the top choice of processing tools 510 from the hierarchy is available for that process (block 840). Upon a determination that the top choice on the hierarchy list is not available, the system 300 selects the next processing tool in the hierarchy (block 850). This step is repeated (shown from the path between block 840 to 850 and back to 840) until the top remaining choice of processing tool 510 in the hierarchy is available. When the system 300 determines that the top choice of the processing tool 510 is available, the system 300 selects that processing tool 510 for processing semiconductor wafers 105 (block 860). The completion of the steps illustrated in FIG. 8 substantially completes the process of performing tool selection process indicated in block 730 of FIG. 7.

Utilizing embodiments of the present invention, a more efficient and more accurate routing and scheduling protocol for processing semiconductor wafers 105 may be performed. This may result in more efficient processing of semiconductor wafers 105 and more accurate and better performing devices produced from the semiconductor wafers 105 due to a lower number of defects and/or faults in the semiconductor wafers 105.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI. The APC is a preferred platform from which to implement the control strategy taught by the present invention. In some embodiments, the APC can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   processing semiconductor wafers using a first processing tool and a second processing tool;
   acquiring data relating to a performance associated with said first processing tool and said performance associated with a second processing tool comprising:
   acquiring metrology data relating to said processed semiconductor wafers;
   acquiring manufacturing-environment data relating to processing of said semiconductor wafers;
   correlating said manufacturing-environment data with said metrology data; and
   performing a fault detection analysis based upon said correlated manufacturing-environment data and metrology data; and
   routing a semiconductor wafer to one of said first processing tool and said second processing tool based upon a comparison between said performance associated with said first processing tool and said performance associated with said second processing tool using a controller.

2. The method described in claim 1, further comprising:
   determining an amount of utilization of at least one of said first and second processing tools; and
   identifying at least one of said first and second processing tools based upon said amount of utilization, defining a flagged processing tool.

3. The method described in claim 2, further comprising performing a maintenance upon said flagged processing tool.

4. The method described in claim 2, wherein determining said amount of utilization of at least one of said first and second processing tools further comprises calculating one of a percentage of time and a length of time that at least one of said first and second processing tools is operational in a predetermined period of time.

5. The method described in claim 1, wherein routing a semiconductor wafer to one of said first processing tool and said second processing tool based upon a comparison between said performance associated with said first processing tool and said performance associated with said second processing tool further comprises determining a hierarchy for said first and said second processing tools for a particular process to be performed on said semiconductor wafer based upon said comparison of said performances of said first and second tools.

6. The method described in claim 5, wherein determining a hierarchy for said first and second processing tools based upon said particular process to be performed further comprises determining a hierarchy for a plurality of processing tools based upon said particular process to be performed on a particular layer of said semiconductor wafer, based upon said comparison of said performances of said first and second tools.

7. The method described in claim 1, further comprising:
   determining a performance for said first and said second processing tools based, at least in part, upon said fault detection analysis;
   comparing said performances of said first and second processing tools; and
   generating a hierarchy of said first and second tools based upon said comparing of said performances of said first and second tools.

8. The method described in claim 7, wherein generating said hierarchy based upon said comparison of said performances further comprises generating an order of preference of processing tools based upon said performances of said first and second tools and at least one business rule.

9. A method, comprising:
   processing semiconductor wafers using a plurality of processing tools;
   acquiring fault data relating to said processed semiconductor wafers, wherein acquiring fault data relating to said processed semiconductor wafers further comprises:
   acquiring metrology data relating to said processed semiconductor wafers;
   acquiring manufacturing-environment data relating to said processing of said semiconductor wafers; and
   correlating said manufacturing-environment data with said metrology data; and
   determining performances of said processing tools based upon said fault data;
   comparing said performances of said processing tools;
   determining a hierarchy of said processing tools based upon said performances of said processing tools; and
   routing a semiconductor wafer to at least one of said processing tools for processing based upon said hierarchy.

10. The method described in claim 9, wherein acquiring fault data relating to said processed semiconductor wafers further comprises:
    generating said fault data based upon correlating said manufacturing-environment data with said metrology data.

11. The method described in claim 9, further comprising:
    determining an amount of utilization of said processing tools; and
    flagging at least one of said processing tools based upon said amount of utilization.

12. The method described in claim 11, further comprising performing a maintenance upon said flagged processing tool.

13. The method described in claim 11, wherein determining said hierarchy of said processing tools further comprises generating an order of preference of said processing tools based upon said performances and at least one business rule.

14. An apparatus, comprising:
    means for processing semiconductor wafers using a first processing tool and a second processing tool;
    means for acquiring data relating to a performance associated with said first processing tool and said performance associated with a second processing tool comprising:
    means for acquiring metrology data relating to said processed semiconductor wafers;
    means for acquiring manufacturing-environment data relating to processing of said semiconductor wafers;
    means for correlating said manufacturing-environment data with said metrology data; and
    means for performing a fault detection analysis based upon said correlated manufacturing-environment data and metrology data; and
    means for routing a semiconductor wafer to one of said first processing tool and said second processing tool based upon a comparison between said performance associated with said first processing tool and said performance associated with said second processing tool using a controller.

15. A system, comprising:
    a plurality of processing tools to process semiconductor wafers; and
    a process controller operatively coupled to said processing tools, said process controller to control operations of said processing tools and perform a selective tool-scheduling process, said selective tool-scheduling process comprising determining a hierarchy for said plurality of said processing tools based upon comparing performances associated with said processing tools and routing a semiconductor wafer to at least one of said processing tools for processing based upon said hierarchy;

a scheduling unit operatively coupled to said process controller, said scheduling unit to determine a routing of said semiconductor wafers based upon said hierarchy of said processing tools, the scheduling unit further comprising:

a tool selection unit to select at least one of said processing tools based upon said hierarchy; and a tool allocation unit operatively coupled to said tool selection unit, said tool allocation unit to allocate a time slot for at least one of said processing tools based upon data from said tool selection unit.

16. The system of claim 15, further comprising:

a central fault detection unit operatively coupled to said process controller, said central fault detection unit to perform fault detection relating to said semiconductor wafers to acquire fault data;

a database operatively coupled to said process controller, said database to store data relating to said hierarchy of said processing tools.

17. The system of claim 16, wherein said scheduling unit being further adapted to determine an amount of utilization of said processing tools and flag at least one of said processing tools based upon said amount of utilization.

18. The system of claim 16, wherein said scheduling unit further comprises:

a tool utilization detection unit operatively coupled to said tool selection unit, said tool utilization detection unit to detect a percentage of tool utilization during a predetermined time period.

19. The system of claim 18, further comprising:

a computer system;

a manufacturing model operatively coupled with said computer system, said manufacturing model to generate and modify at least one control input parameter signal that controls processing of said wafer;

a machine interface operatively coupled with said manufacturing model and to at least one of said processing tools, said machine interface being capable of receiving process recipes from said manufacturing model;

a metrology tool operatively coupled with said at least one of said processing tool, said metrology tool to acquire metrology data relating to said semiconductor wafers; and a manufacturing-environment sensor operatively coupled with said processing tool, said sensor to acquire manufacturing-environment data relating to processing of said semiconductor wafers.

20. The system of claim 19, wherein said computer system is capable of generating modification data for modifying at least one control input associated with an operation of said processing tool.

21. An apparatus, comprising:

a process controller operatively coupled to a plurality of processing tools, said process controller to control operations of said processing tools and perform a selective tool-scheduling process, said selective tool-scheduling process comprising determining a hierarchy for said plurality of processing tools based upon comparing performances associated with said processing tools and routing a semiconductor wafer to at least one of said processing tools for processing based upon said hierarchy; and a scheduling unit operatively coupled to said process controller, said scheduling unit to determine a routing of said semiconductor wafers based upon said hierarchy of said processing tools, wherein said scheduling unit further comprises:

a tool selection unit to select at least one of said processing tools based upon said hierarchy; and a tool allocation unit operatively coupled to said tool selection unit, said tool allocation unit to allocate a time slot for at least one of said processing tools based upon data from said tool selection unit.

22. The apparatus of claim 21, further comprising:

a central fault detection unit operatively coupled to said process controller, said central fault detection unit to perform fault detection relating to said semiconductor wafer to acquire fault data;

a database operatively coupled to said process controller, said database to store data relating to said hierarchy of said processing tools.

23. The apparatus of claim 22, wherein said scheduling unit being further adapted to determine an amount of utilization of said processing tools and flag at least one of said processing tools based upon said amount of utilization.

24. The apparatus of claim 22, wherein said scheduling unit further comprises:

a tool utilization detection unit operatively coupled to said tool selection unit, said tool utilization detection unit to detect a percentage of tool utilization during a predetermined time period.

25. A computer readable program storage device encoded with instructions that, when executed by a computer, performs a method, comprising:

processing semiconductor wafers using a first processing tool and a second processing tool;

acquiring data relating to a performance associated with said first processing tool and said performance associated with a second processing tool comprising:

acquiring metrology data relating to said processed semiconductor wafers;

acquiring manufacturing-environment data relating to processing of said semiconductor wafers;

correlating said manufacturing-environment data with said metrology data; and performing a fault detection analysis based upon said correlated manufacturing-environment data and metrology data and routing a semiconductor wafer to one of said first processing tool and said second processing tool based upon a comparison between said performance associated with said first processing tool and said performance associated with said second processing tool using a controller.

26. The computer readable program storage device encoded with instructions that, when executed by a computer, performs the method described in claim 25, the method further comprising:

determining an amount of utilization of at least one of said first and second processing tools; and identifying at least one of said first and second processing tools based upon said amount of utilization, defining a flagged processing tool.

27. The computer readable program storage device encoded with instructions that, when executed by a computer, performs the method described in claim 26, the method further comprising performing a maintenance upon said flagged processing tool.

28. The computer readable program storage device encoded with instructions that, when executed by a computer, performs the method described in claim 26, wherein determining said amount of utilization of at least one of said first and second processing tools further comprises calculating one of a percentage of time and a length of time that at least one of said first and second processing tools is operational in a predetermined period of time.

29. The computer readable program storage device encoded with instructions that, when executed by a computer, performs the method described in claim 25, wherein routing a semiconductor wafer to one of said first processing tool and said second processing tool based upon a comparison between said performance associated with said first processing tool and said performance associated with said second processing tool further comprises determining a hierarchy for said first and said second processing tools for a particular process to be performed on said semiconductor wafer based upon said comparison of said performances of said first and second tools.

30. The computer readable program storage device encoded with instructions that, when executed by a computer, performs the method described in claim 29, wherein determining a hierarchy for said first and second processing tools based upon said particular process to be performed further comprises determining a hierarchy for a plurality of processing tools based upon said particular process to be performed on a particular layer of said semiconductor wafer, based upon said comparison of said performances of said first and second tools.

31. The computer readable program storage device encoded with instructions that, when executed by a computer, performs the method described in claim 25, further comprising:
 determining a performance for said first and said second processing tools based upon said fault detection analysis;
 comparing said performances of said first and said second processing tools; and
 generating a hierarchy of said first and second tools based upon said comparing of said performances of said first and second tools.

32. The computer readable program storage device encoded with instructions that, when executed by a computer, performs the method described in claim 31, wherein generating said hierarchy based upon said comparison of said performances further comprises generating an order of preference of processing tools based upon said performances of said first and second tools and at least one business rule.

* * * * *